(12) United States Patent
Lohr

(10) Patent No.: US 6,196,433 B1
(45) Date of Patent: Mar. 6, 2001

(54) BASKET FOR BICYCLES

(75) Inventor: Hans-Gerhard Lohr, Hamm (DE)

(73) Assignee: Löhr GmbH, Bönen (DE)

( * ) Notice: Subject to any disclaimer, the term of this patent is extended or adjusted under 35 U.S.C. 154(b) by 0 days.

(21) Appl. No.: 09/308,025

(22) PCT Filed: Sep. 22, 1997

(86) PCT No.: PCT/EP97/05180

§ 371 Date: May 12, 1999

§ 102(e) Date: May 12, 1999

(87) PCT Pub. No.: WO98/22332

PCT Pub. Date: May 28, 1998

(30) Foreign Application Priority Data

Nov. 19, 1996 (DE) .......................................... 296 20 043 U
Jan. 31, 1997 (DE) .......................................... 297 01 597 U

(51) Int. Cl.$^7$ ...................................................... B62J 7/06
(52) U.S. Cl. .......................... 224/431; 224/420; 224/434
(58) Field of Search .................................. 224/400, 412,
224/419, 420, 421, 428, 429, 430, 431,
433, 434, 435, 441, 447, 450; D12/407,
409, 410, 411; 248/220.21, 221.11, 221.12,
222.14, 223.41, 224.8, 222.41

(56) References Cited

U.S. PATENT DOCUMENTS

| | | | |
|---|---|---|---|
| 1,908,535 | * 5/1933 | Pawsat | 224/420 X |
| 2,253,649 | * 8/1941 | Price | 224/434 X |
| 2,541,640 | * 2/1951 | Dennis | 224/421 X |
| 2,783,927 | * 3/1957 | Harley | 224/435 X |
| 3,995,803 | * 12/1976 | Uitz | 224/421 X |
| 4,230,382 | * 10/1980 | Wenzlick et al. | 248/223.41 X |
| 4,328,915 | * 5/1982 | Melton, III | 224/434 X |
| 5,282,554 | * 2/1994 | Thomas | 224/421 |
| 5,653,366 | * 8/1997 | Liserre | 224/433 X |
| 6,036,071 | * 3/2000 | Hartmann et al. | 224/547 |

FOREIGN PATENT DOCUMENTS

| | | | |
|---|---|---|---|
| 39 27 086 | 1/1991 | (DE) . | |
| 93 02 297 | 4/1993 | (DE) . | |
| 195 34 204 | 3/1997 | (DE) . | |
| 1127921 | 12/1956 | (FR) . | |
| 140627 | * 4/1920 | (GB) | 224/36 |
| 9-030471 | 2/1997 | (JP) . | |
| 222107 | * 4/1920 | (SE) | 224/36 |
| 94 11233 | 5/1994 | (WO) . | |

* cited by examiner

Primary Examiner—Gregory M. Vidovich
(74) Attorney, Agent, or Firm—Pauley Petersen Kinne & Fejer

(57) ABSTRACT

A basket for bicycles having a coupling device to detachably suspend it on a coupling element fitted on handlebars. The basket has a simple design and is easy to handle because of rigidly integrating a coupling plate in the sidewall of the basket that faces the coupling element. In the coupling plate, suspension elements adapted to the coupling element are formed by at least one correspondingly shaped window in a plane of the coupling plate.

14 Claims, 1 Drawing Sheet

BASKET FOR BICYCLES

BACKGROUND OF THE INVENTION

1. Field of the Invention

This invention relates to a bicycle basket with a coupling device for the releasable suspension in at least one coupling element attached in an area of handlebars of the bicycle.

2. Description of Prior Art

A bicycle basket with a coupling device is recited in German Patent Application No. 195 34 204. A plate-like coupling element is applied to an exterior of a lateral wall of this known bicycle basket, which is connected with a plate-like counter element arranged on an interior of the lateral wall. The coupling element has suspension elements, by means of which it is releasably suspended in corresponding receivers of a coupling piece attached to the handlebars. The plate-like coupling element projects past the exterior surface of the lateral wall at least far enough so that in the coupled state the receivers grip the suspension elements from behind.

A carrying bag is known from German Patent Reference DE 39 27 086 A1, which can be attached by a connecting element to a coupling piece also provided on the handlebars. The connecting element has holding elements projecting outward into the coupling piece, which can pose obstacles after the carrying bag is removed.

SUMMARY OF THE INVENTION

This invention is based on one object of providing a bicycle basket of the type mentioned at the outset, which has simply designed coupling elements and poses no obstacles when removed from the bicycle.

This object is attained by means of the characteristics recited in the claims. One or several coupling plates are fixedly integrated in a lateral wall of a bicycle basket facing at least one coupling element, in which suspension elements matched to the coupling element are formed on the level of the coupling plate by at least one appropriately shaped window.

Thus the bicycle basket can be attached to the coupling piece without any parts which must be additionally attached. The window with the coupling elements can be simply produced, for example with an appropriate stamped-out portion of the coupling plate or by shaping. Several coupling plates with respective windows can be arranged, corresponding to several receivers of one or several coupling elements, in the facing lateral wall of the bicycle basket, so that a solid support is achieved. Since each coupling plate is integrated into the lateral wall and essentially does not project past an outermost level of the lateral wall, in its usual, slightly conically downward tapering shape the bicycle basket can be easily stacked.

Thus, each coupling plate located on the level of the lateral wall is enclosed by lattice bars at least at their lateral edges, the arrangement of the coupling plate is clearly predetermined during assembly, and a simple, solid attachment is achieved.

With bicycle baskets made of relatively thin, finely meshed lateral walls in particular, such as are increasingly used, an embodiment is advantageous wherein each coupling plate is attached to the lateral wall, and wherein the lattice elements of the lateral wall are cut out in an area of the windows.

It is advantageous for production, the durability as well as the appearance, if lattice elements, lattice bars and each coupling plate are together coated with a lacquer or plastic material. Thus, sharp-edged transitions are also avoided.

For example, the coupling plate can be simply attached by being welded or glued in a position.

A simply designed coupling plate can be, for example, a rectangular window or one in the shape of an elongated hole, with the upper side as the suspension element, wherein the rectangular shape or the elongated holes is essentially matched to the width of the receivers, in order to preclude a lateral displacement to the greatest extent possible, or the window has a rectangular shape and the suspension elements are designed as protrusions, which are arranged in an upper corner. The further suspension elements are designed as protrusions, which are arranged on an appropriate vertical rectangular side, that project into a free space of the windows and are located on the level of the plate. In this case the suspension elements of a window are in particular located vertically above each other, so that the lateral wall of the basket can be placed flat against the coupling piece and can be suspended in the receivers of the coupling piece with a simple downward movement. A solid coupling is achieved in this way and tilting of the basket is prevented.

Particularly suitable for thin-walled, fine-meshed wire baskets are the steps, by which the lattice bars which frame the lateral edges of the coupling plate are fixedly attached to the lattice elements of the lateral wall and continue as far as or beyond the lower edge of the lateral wall into the bottom area of the bicycle basket, since not only is the coupling plate definitely fixed in place, but a reinforcement of the lateral wall is also achieved.

Additional support for the bicycle basket can be achieved because in the connected state the bicycle basket is supported on the front axle or the front fork by supports.

The step, that the bicycle basket has a foldable carrying strap, is advantageous for simple removal and manipulation. Manipulation is aided, together with a suspension and removal movement, which is performed in a vertical direction.

Locking with a locking bolt or the like on the coupling element is possible with a bolt receiver provided in the coupling plate.

BRIEF DESCRIPTION OF THE DRAWINGS

The invention will be explained in greater detail in what follows by means of an exemplary embodiment, making reference to the drawings, wherein.

DESCRIPTION OF PREFERRED EMBODIMENTS

Figure 1:
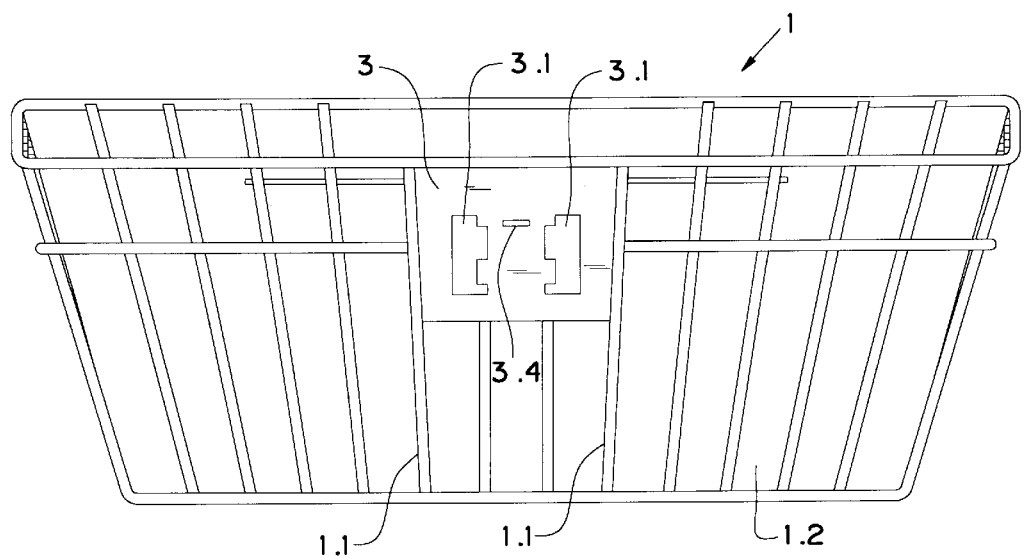
FIG. 1 shows a bicycle basket made of wire lattice bars with an integrated coupling plate, in a perspective view from a coupling side.
Figure 2:
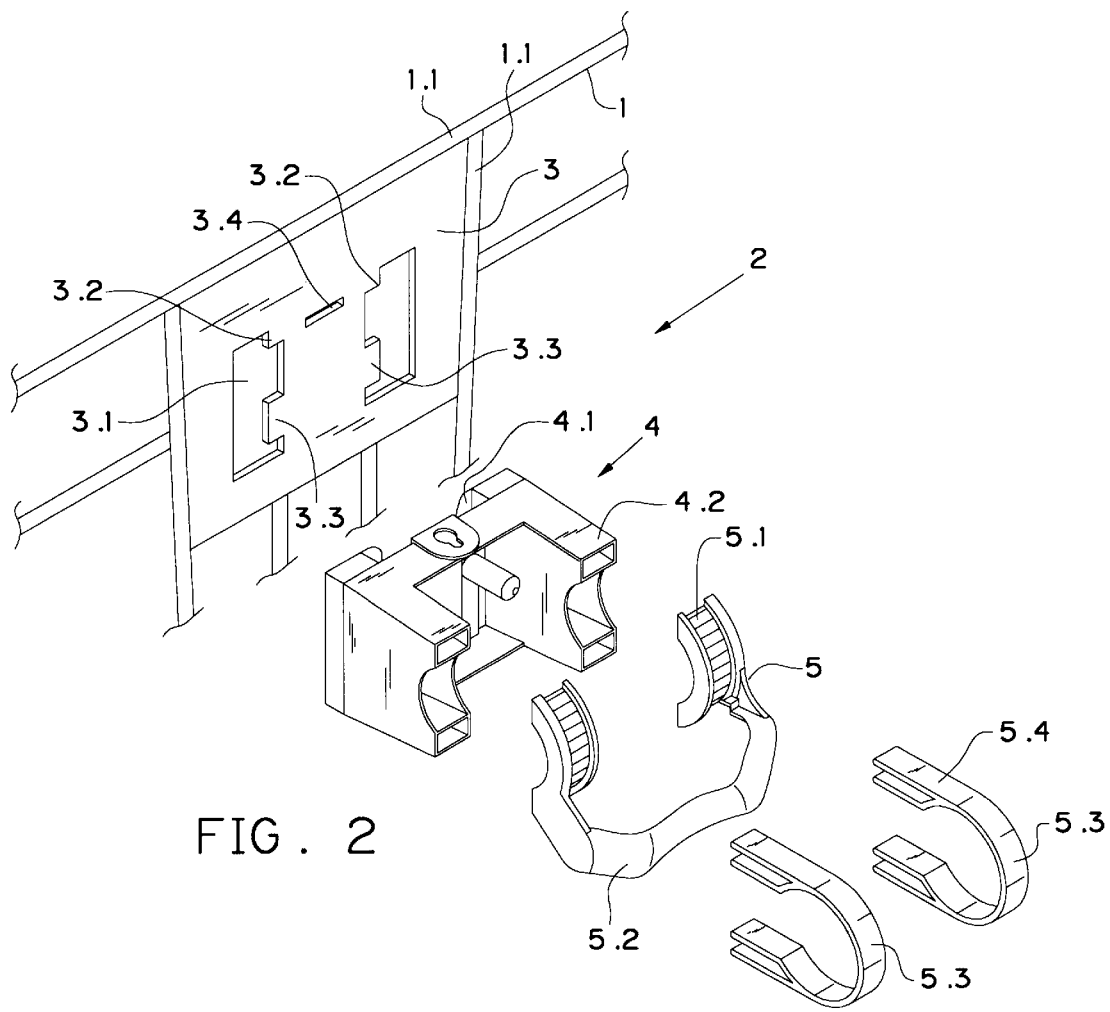
FIG. 2 shows an exploded view of a section of the bicycle basket represented in FIG. 1 and a coupling element in a shape of a coupling piece which is to be attached to the handlebars.

FIG. 1 represents a bicycle basket 1 made of wire lattice bars 1.1. A coupling plate 3 is integrated below the upper edge in the center of the a lateral wall 1.2, with which the bicycle basket 1 is coupled to handlebars, such as on a handlebar shackle or a handlebar protrusion, via a coupling element in the shape of a coupling piece 4. The coupling plate 3 and the coupling piece 4, as shown in FIG. 2, constitute a coupling device 2.

The coupling plate 3 is laterally framed between two essentially vertical lattice bars 1.1 and rests with an upper edge against the underside of the lattice bar forming an upper edge of the bicycle basket 1, so that a definite positioning of the coupling plate 3 and a simple fastening are made possible. Because of this and with its surface facing the exterior, the coupling plate 3 essentially lies on the exterior level of the lateral wall 1.2. Two windows 3.1 are formed in the coupling plate 3, for example by being correspondingly formed or stamped out. The windows 3.1 have the basic shape of a vertically oriented rectangle, wherein suspension elements 3.2 projecting into a free space are formed on the facing insides of the windows 3.1, as well as further suspension elements 3.3, as also shown in FIG. 2. The suspension elements 3.2 are arranged in the upper corner, while the further suspension elements 3.3 are positioned slightly below the center. A further opening between the two windows 3.1 is formed as a bolt receiver 3.4, which can be engaged by a locking bolt of the coupling piece 4.

On a front end facing the lateral wall 1.2 of the bicycle basket 1, the coupling piece 4 has receivers 4.1, which are positioned to correspond with the suspension elements 3.2 and the further suspension elements 3.3 and are matched in such a way that a solid sliding seating results, wherein the bicycle basket 1 is initially contacted with the front of the coupling piece 4 in such a way that the receivers 4.1 lie vertically underneath the suspension elements 3.2 and the further suspension elements 3.3, and the bicycle basket 1 can be suspended in the receivers 4.1 by the suspension elements 3.2 and the further suspension elements 3.3 by simply pushing the bicycle basket 1 downward. The bolt receiver 3.4 allows a catching engagement of a lock bolt, or an engagement of a lock bolt which is operated with a key, so that not only can the basket 1 be additionally secured while riding, but unauthorized removal is also prevented.

With a fastening section 4.2, the coupling piece 4 is fastened on the handlebars by means of clamps 5.3, wherein plug pins 5.4 are placed into appropriately designed chambers of the fastening section 4.2 and are drawn tight by means of screws from the front of the coupling piece 4. To prevent tilting of the coupling piece 4, a holding strap 5, which has teeth 5.1 and is supported by means of a support bridge 5.2 underneath the handlebar projection, can be additionally fixed in place between the clamps 5.3 and the handlebar. In this case the exterior teeth 5.3 work together with matched interior teeth of the clamps 5.3, as explained in greater detail in German Patent Application No. 195 34 204 mentioned at the outset.

The coupling plate 3 is preferably welded on, but can also be fastened in another way, for example glued on. After fastening on the basket 1, the latter can be lacquered or coated with plastic, together with the coupling plate.

The coupling plate 3 is also particularly suited for fine-meshed baskets, such as are increasingly coming into use. Here, the lateral walls are comparatively thin-walled, so that with such baskets, lattice bars 1.1 are additionally attached on both sides of the coupling plate 3 on the lateral wall for reinforcement, and can be continued into the bottom area of the basket 1. With such fine-meshed bicycle baskets, the coupling plate 3 can be fastened on the lateral wall 1.2, wherein the lateral wall 1.2 is cut out in the area of the windows 3.1 either before or afterwards. In this case the reinforcing lattice bars 1.1 are also fastened on the lateral wall 1.2, so that the coupling plate 3 then also essentially lies in the outer level of the lateral wall 1.2.

Larger bicycle baskets 1 in particular can be additionally supported by means of support struts on the bicycle axle or the front fork. The bicycle basket 1 preferably has a carrying strap for handling, so that the bicycle basket 1 can also be easily removed with one hand from the bicycle.

What is claimed is:

1. In a bicycle basket with a coupling device, having at least one coupling plate (3) fixedly integrated in a lateral wall (1.2) of the bicycle basket (1), the coupling plate having at least one window (3.1) defined within the periphery of the coupling plate, for attaching the bicycle basket (1) to the bicycle with at least one coupling element (4), the improvement comprising:
    the at least one coupling plate (3) for releasable suspension with the at least one coupling element (4) which is constructed and arranged for attachment to a handlebar area of the bicycle, and
    a plurality of suspension elements (3.2, 3.3) adapted to receive the at least one coupling element (4) and formed in the at least one window (3.1) of the coupling plate (3) and wherein the at least one window (3.1) has a rectangular basic shape and one of the suspension elements (3.2) is designed as a protrusion arranged in an upper corner and the other suspension element is designed as a protrusion arranged on an appropriate vertical side of the window, each of the protrusions project into a free space of the at least one window (3.1) and are located coplanar with the at least one coupling plate (3).

2. In the bicycle basket in accordance with claim 1, wherein
    the coupling plate (3) located coplanar with the lateral wall (1.2) and enclosed by a plurality of lattice bars (1.1) at least on lateral edges of the coupling plate.

3. In the bicycle basket in accordance with claim 2, wherein
    a plurality of lattice elements of the lateral wall (1.2) are cut out in an area of the window (3.1).

4. In the bicycle basket in accordance with claim 3, wherein
    the lattice elements, the lattice bars (1.1) and the coupling plate (3) are together coated with one of a lacquer material and a plastic material.

5. In the bicycle basket in accordance with claim 4, wherein the coupling plate (3) is one of welded and glued in place with respect to the lateral wall.

6. In the bicycle basket in accordance with claim 5, wherein the one suspension element (3.2) and the other suspension elements are designed as protrusions arranged on the appropriate vertical rectangular side, to project into a free space of the at least one window (3.1).

7. In the bicycle basket in accordance with claim 6, wherein
    the lattice bars (1.1) framing lateral edges of the coupling plate (3) are fixedly attached to the lattice elements of the lateral wall (1.2) and continue one of as far as the lower edge of the lateral wall (1.2) and beyond the lower edge of the lateral wall into a bottom area of the bicycle basket (1).

8. In the bicycle basket in accordance with claim 7, wherein a bolt receiver (3.4) is provided in the coupling plate (3).

9. In the bicycle basket in accordance with claim 1, wherein a plurality of lattice elements of the lateral wall (1.2) are cut out in an area of the window (3.1).

10. In the bicycle basket in accordance with claim 1, wherein the coupling plate (3) is coated with one of a lacquer material and a plastic material.

11. In the bicycle basket in accordance with claim 1, wherein the coupling plate (3) is one of welded and glued in place with respect to the lateral wall.

12. In the bicycle basket in accordance with claim 1, wherein the one suspension element (3.2) and the other suspension element are designed as protrusions arranged on the vertical rectangular side, to project into a free space of the at least one window (3.1).

13. In the bicycle basket in accordance with claim 2, wherein the lattice bars (1.1) framing lateral edges of the coupling plate (3) are fixedly attached to lattice elements of the lateral wall (1.2) and continue one of as far as the lower edge of the lateral wall (1.2) and beyond the lower edge of the lateral wall into a bottom area of the bicycle basket (1).

14. In the bicycle basket in accordance with claim 1, wherein a bolt receiver (3.4) is provided in the coupling plate (3).

* * * * *